(12) United States Patent
Ji

(10) Patent No.: US 12,379,002 B2
(45) Date of Patent: Aug. 5, 2025

(54) CLUTCH

(71) Applicant: Illinois Tool Works Inc., Glenview, IL (US)

(72) Inventor: Linjie Ji, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/436,592

(22) Filed: Feb. 8, 2024

(65) Prior Publication Data

US 2024/0263676 A1 Aug. 8, 2024

(30) Foreign Application Priority Data

Feb. 8, 2023 (CN) .......................... 202310097943.X
Jan. 5, 2024 (CN) .......................... 202410023836.7

(51) Int. Cl.
*F16D 11/14* (2006.01)
*F16D 23/12* (2006.01)

(52) U.S. Cl.
CPC .............. *F16D 11/14* (2013.01); *F16D 23/12* (2013.01)

(58) Field of Classification Search
CPC ..... F16D 2011/008; F16D 11/14; F16D 7/044
See application file for complete search history.

(56) References Cited

U.S. PATENT DOCUMENTS

| | | | |
|---|---|---|---|
| 2009/0104998 A1* | 4/2009 | Chuang ................... | F16D 7/044 464/39 |
| 2019/0264755 A1* | 8/2019 | Giehl ...................... | F16D 11/14 |
| 2019/0301544 A1* | 10/2019 | Vaughn .................... | F16H 3/10 |
| 2020/0347894 A1* | 11/2020 | Egberink ................ | F16D 7/044 |
| 2022/0268321 A1* | 8/2022 | Kobayashi .............. | F16D 7/044 |
| 2023/0340810 A1 | 10/2023 | Rudolf | |
| 2023/0374842 A1 | 11/2023 | Och | |

FOREIGN PATENT DOCUMENTS

| | | | | | |
|---|---|---|---|---|---|
| CN | 111550502 B | * | 8/2021 | ............. | B41J 29/00 |
| EP | 4227201 A1 | * | 8/2023 | ............. | H02K 7/006 |

* cited by examiner

*Primary Examiner* — Stacey A Fluhart
(74) *Attorney, Agent, or Firm* — McAndrews, Held & Malloy, Ltd.

(57) ABSTRACT

The present disclosure provides a clutch, comprising: a first rotating component (101), the first rotating component (101) being provided with a mounting cavity (205); a clutch mechanism (160), the clutch mechanism (160) being mounted in the mounting cavity (205); and a second rotating component (105), wherein the first rotating component (101), the clutch mechanism (160), and the second rotating component (105) are configured such that the first rotating component (101) is engagable with or disengagable from the second rotating component (105) by means of the clutch mechanism (160); and wherein at least a portion of the second rotating component (105) is mounted in the mounting cavity (205). The clutch of the present disclosure has a simple axial fixation structure.

19 Claims, 11 Drawing Sheets

CLUTCH

RELATED APPLICATIONS

The present application claims the benefit of Chinese Patent Application Nos. 202310097943X, filed Feb. 8, 2023, and CN 2024100238367, filed Jan. 5, 2024, each titled "Clutch," the contents of which are hereby incorporated by reference.

TECHNICAL FIELD

The present disclosure relates to a clutch, and in particular to a clutch applied for overload protection of a vehicle.

BACKGROUND

A clutch comprises an input end, an output end and a clutch mechanism, and the input end of the clutch is engagable with or disengagable from the output end thereof by means of the clutch mechanism, so that the transmission of power can be controlled. One type of clutch is an overload protection clutch, an output end of which is connected to a working part. When the working part is overloaded and a required torque exceeds a set value, the output end of the overload protection clutch is disengaged from the input end thereof; and when the overload disappears, the output end of the overload protection clutch automatically restores engagement with the input end thereof.

SUMMARY OF THE DISCLOSURE

The present disclosure relates generally to a clutch, substantially as illustrated by and described in connection with at least one of the figures, as set forth more completely in the claims.

BRIEF DESCRIPTION OF THE DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION OF EMBODIMENTS

Figure 1A:
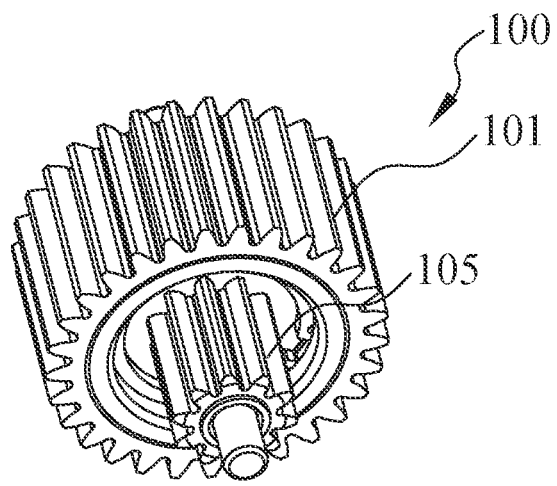
FIG. 1A is a perspective view of a clutch according to a first embodiment of the present disclosure.

Various specific embodiments of the present invention are described below with reference to the accompanying drawings which constitute part of this description. It should be understood that although the terms such as "front", "rear", "upper", "lower", "left", and "right" indicating directions are used in the present disclosure to describe various exemplary structural parts and elements of the present disclosure, these terms used herein are merely used for ease of description and are determined based on the exemplary orientation shown in the accompanying drawings. Since the embodiments disclosed in the present disclosure can be arranged in different directions, these terms indicating directions are merely illustrative and should not be considered as limitations. If possible, the same or similar reference numerals used in the present disclosure refer to the same components.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The present disclosure provides a clutch, comprising: a first rotating component, the first rotating component being provided with a mounting cavity; a clutch mechanism, the clutch mechanism being mounted in the mounting cavity; and a second rotating component, wherein the first rotating component, the clutch mechanism, and the second rotating component are configured such that the first rotating component is engagable with or disengagable from the second rotating component by means of the clutch mechanism; and wherein at least a portion of the second rotating component is mounted in the mounting cavity.

In the clutch as described above, the mounting cavity cooperates with the second rotating component to provide axial fixation of the second rotating component.

In the clutch as described above, the clutch further comprises a fixing device, the fixing device cooperating with the mounting cavity so as to provide axial fixation of the second rotating component in the mounting cavity.

In the clutch as described above, the second rotating component comprises a step surface, and a groove is provided in the mounting cavity; and the fixing device is a snap ring, and the snap ring cooperates with the groove and the step surface so as to provide axial fixation of the second rotating component in the mounting cavity.

In the clutch as described above, the groove is an annular groove extending in a circumferential direction, and the snap ring has an opening.

In the clutch as described above, the first rotating component is a first gear, a first set of teeth is provided on an outer side of the first gear, and at least a portion of the first set of teeth is aligned with the mounting cavity; and the second rotating component is a second gear, the second gear comprises a transmission portion, and a second set of teeth is provided on an outer side of the transmission portion.

In the clutch as described above, the clutch mechanism comprises an elastic device and an engagement element, the mounting cavity has a bottom, and the elastic device is disposed between the bottom and the engagement element.

In the clutch as described above, the elastic device is a spring, a plurality of protrusions are provided at one end of the engagement element, and a plurality of recesses are provided at one end of the second rotating component, and the protrusions are capable of matching with the recesses, such that the clutch mechanism is engaged with or disengaged from the second rotating component.

In the clutch as described above, the first rotating component comprises a positioning portion, the engagement element comprises a matching portion, and the positioning portion is capable of matching with the matching portion to limit a rotation of the engagement element relative to the first rotating component.

In the clutch as described above, the first rotating component is a driving component, and the second rotating component is a transmission component.

In the clutch as described above, the first rotating component is a transmission component, and the second rotating component is a driving component.

In the clutch as described above, the first rotating component has a first axial end and a second axial end, and the first set of teeth extends from the first axial end to the second axial end.

In the clutch as described above, the first rotating component comprises a bushing and a toothed portion, the groove is provided in the bushing, and the bushing is integrally formed with the toothed portion.

In the clutch as described above, each of the snap ring and the bushing is made of a metallic material.

In the clutch as described above, the clutch further comprises a shaft, wherein the shaft passes through the first rotating component, the clutch mechanism and the second rotating component, the first rotating component, the clutch mechanism and the second rotating component are rotatable about the shaft, and the shaft is capable of limiting radial movements of the first rotating component, the clutch mechanism and the second rotating component.

In the clutch as described above, the clutch is used for overload protection of a vehicle.

The present disclosure further provides an actuator, comprising: a clutch as described above; a worm, the worm being drivable to rotate; an input gear assembly, the input gear assembly being capable of meshing with each of the first rotating component and the worm, such that the worm is capable of driving the first rotating component to rotate by means of the input gear assembly; and an output gear, the output gear being capable of meshing with the second rotating component.

In the actuator as described above, a meshing position of the input gear assembly and the first rotating component is close to an end of the first rotating component facing the second rotating component.

In the actuator as described above, when the output gear is subjected to an external overload force, the second rotating component is disengagable from the first rotating component.

In the actuator as described above, the plurality of protrusions are arranged in a circumferential direction, each of the plurality of protrusions has a first engagement surface and a second engagement surface that are disposed opposite each other, the first engagement surface of each protrusion is located on the same side of each protrusion in the circumferential direction, and an inclination angle of the first engagement surface relative to a radial direction of the clutch is less than an inclination angle of the second engagement surface relative to the plane in the radial direction of the clutch; and the plurality of recesses are arranged in the circumferential direction, each of the plurality of recesses has a first matching surface and a second matching surface that are disposed opposite each other, the first matching surface is capable of matching with the first engagement surface and the second matching surface is capable of matching with the second engagement surface, the first matching surface of each recess is located on the same side of each recess in the circumferential direction, and an inclination angle of the first matching surface relative to the radial direction of the clutch is less than an inclination angle of the second matching surface relative to the plane in the radial direction of the clutch. The clutch of the present disclosure comprises a first rotating component, a clutch mechanism, a second rotating component, and a fixing device, wherein one of the first rotating component and the second rotating component is a driving component, and the other thereof is a transmission component; and the first rotating component is provided with a mounting cavity, and the clutch mechanism, a portion of the second rotating component and the fixing device are located in the mounting cavity. The first rotating component is engagable with or disengagable from the second rotating component by means of the clutch mechanism. The fixing device cooperates with the mounting cavity and can axially fix the second rotating component and the first rotating component.

Figure 1B:
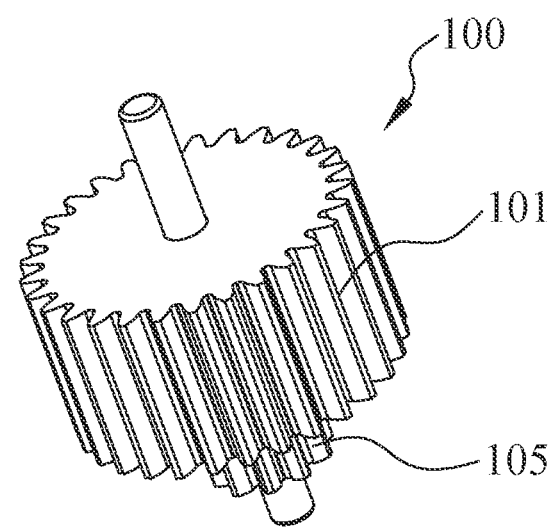
FIG. 1B is a perspective view of the clutch in FIG. 1A from another perspective.
Figure 1C:
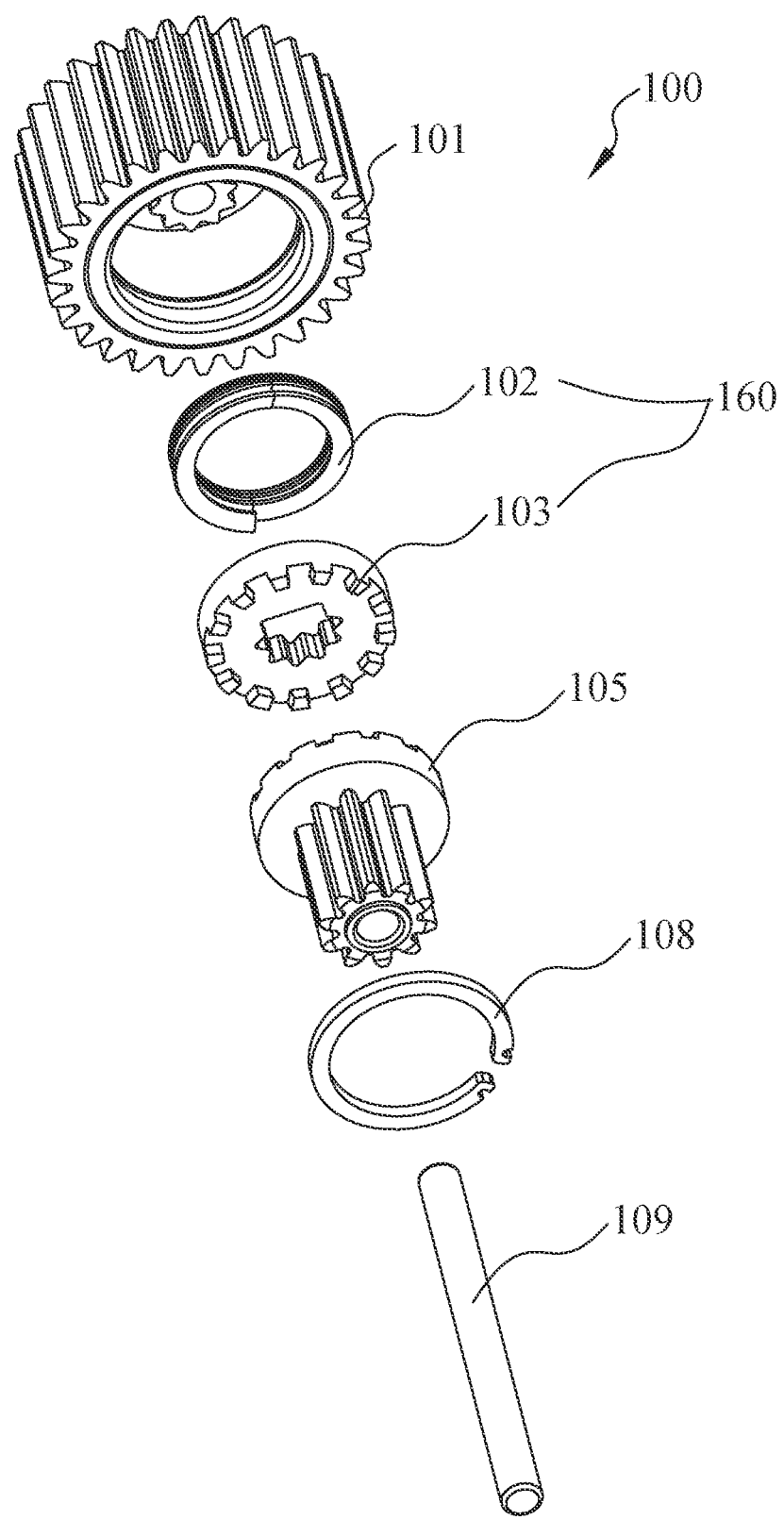
FIG. 1C is an exploded view of the clutch in FIG. 1A.

FIG. 1A is a perspective view of a clutch according to a first embodiment of the present disclosure, FIG. 1B is a perspective view of the clutch in FIG. 1A from another perspective, and FIG. 1C is an exploded view of the clutch in FIG. 1A. As shown in FIGS. 1A-1C, the clutch 100 comprises a first rotating component 101, a clutch mechanism 160, a second rotating component 105, a fixing device 108 and a shaft 109. The shaft 109 passes through the first rotating component 101, the clutch mechanism 160, and the second rotating component 105. The fixing device 108 axially fixes the first rotating component 101, the clutch mechanism 160, and the second rotating component 105. The first rotating component 101, the clutch mechanism 160 and the second rotating component 105 are rotatable about the shaft 109, but are not movable radially relative to the shaft 109. One of the first rotating component 101 and the second rotating component 105 is a driving component that is connected to a power input end; and the other thereof is a transmission component that is connected to a power output end. The clutch mechanism 160 is disposed between the first rotating component 101 and the second rotating component 105. The clutch mechanism 160 comprises an elastic device 102 and an engagement element 103. The engagement element 103 is connected to the first rotating component 101 and is movable in an axial direction of the first rotating component 101. The engagement element 103 is engagable with or disengagable from the second rotating component 105 so as to enable or disenable the power transmission between the first rotating component 101 and the second rotating component 105.

Figure 2A:
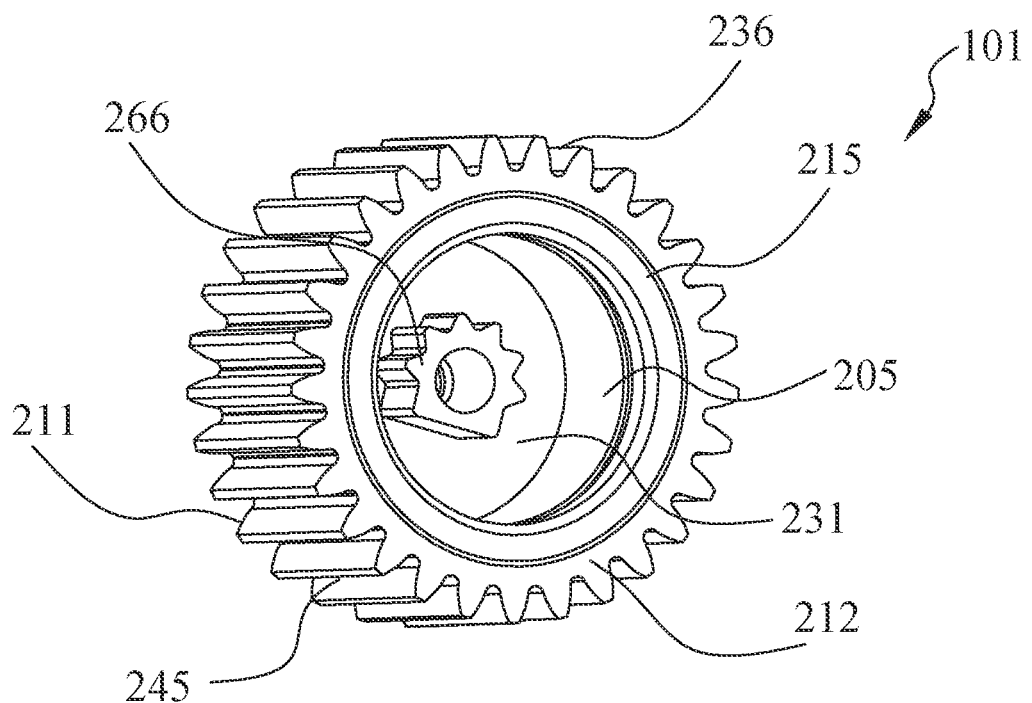
FIG. 2A is a perspective view of a first rotating component in FIG. 1C.
Figure 2B:
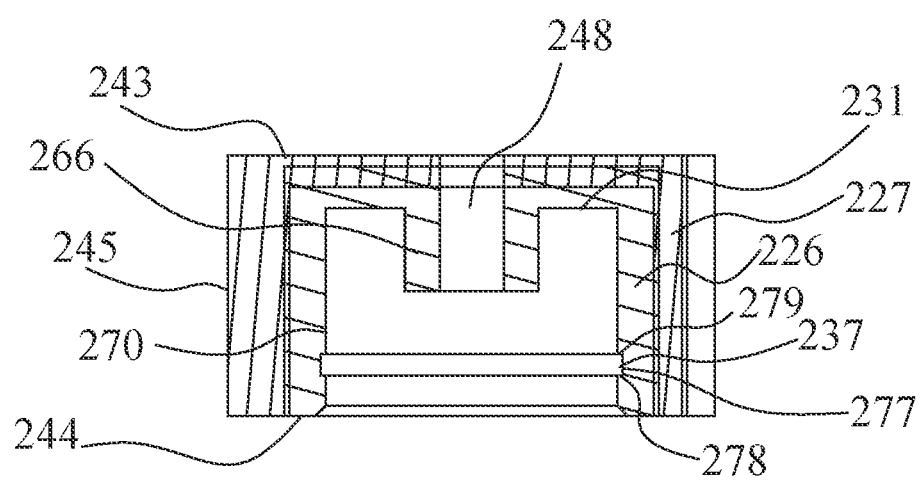
FIG. 2B is an axial cross-sectional view of the first rotating component in FIG. 2A.

FIG. 2A is a perspective view of the first rotating component in FIG. 1C, and FIG. 2B is an axial cross-sectional view of the first rotating component in FIG. 2A. As shown in FIGS. 2A and 2B, the first rotating component 101 is a gear with a substantially cylindrical outer contour, and has a first axial end 211 and a second axial end 212. The first rotating component 101 comprises a first end surface 243, a second end surface 244, and a side portion 245. The first end surface 243 is located at the first axial end 211, the second end surface 244 is located at the second axial end 212, and the side portion 245 is connected to the first end surface 243 and the second end surface 244 and extends in a circumferential direction. A first set of teeth 236 is provided on the side portion 245, and the first set of teeth 236 extends in the axial direction of the first rotating component 101 and extends from the first axial end 211 to the second axial end 212. That is to say, the first set of teeth 236 is arranged across the side portion 245 of the first rotating component 101. The first rotating component 101 is provided with a mounting cavity 205, and the mounting cavity 205 is formed by recessing from the second end surface 244 toward the interior of the first rotating component 101. The mounting cavity 205 has a cavity opening 215, a side wall 270 and a bottom 231. The cavity opening 215 is provided in the second end surface 244, and the clutch mechanism 160 and the second rotating component 105 can be mounted into the first rotating component 101 from the cavity opening 215.

The first rotating component 101 further comprises a positioning portion 266, and the positioning portion 266 is located in the mounting cavity 205 and protrudes from the bottom 231. Protruding positioning teeth are provided on an outer side of the positioning portion 266, such that a cross section of the positioning portion 266 is non-circular, and thus the positioning portion 266 is in an anti-rotation shape. The positioning portion 266 is used for matching with the engagement element 103, so as to prevent the engagement element 103 from rotating relative to the first rotating component 101. A hole 248 is also provided in the first rotating component 101, the hole 248 extends through the first end surface 243 and the positioning portion 266, and the hole 248 is used for mounting the shaft 109.

A groove 237 is provided in the mounting cavity 205, and the groove 237 is formed by recessing from the side wall 270 of the mounting cavity 205 in a direction away from a central axis of the first rotating component 101. The groove 237 is an annular groove and is close to the second axial end 212. The groove 237 has a bottom 277 extending in the axial direction, and a pair of side walls 278 and 279 extending in a radial direction.

The first rotating component 101 comprises a toothed portion 227 and a bushing 226, and the bushing 226 is disposed inside the toothed portion 227. The bushing 226 is made of a metallic material, and the toothed portion 227 is made of a thermoplastic material. The toothed portion 227 and the bushing 226 are integrally formed by means of an insert injection molding process. The groove 237 is provided in the bushing 226, and the positioning portion 266 is formed by the bushing 226. The bushing 226 is made of the metallic material, so that the groove 237 and the positioning portion 266 have certain strength and are wear-resistant.

In another embodiment of the present disclosure, the first rotating component 101 is made of one and the same material.

Figure 3A:
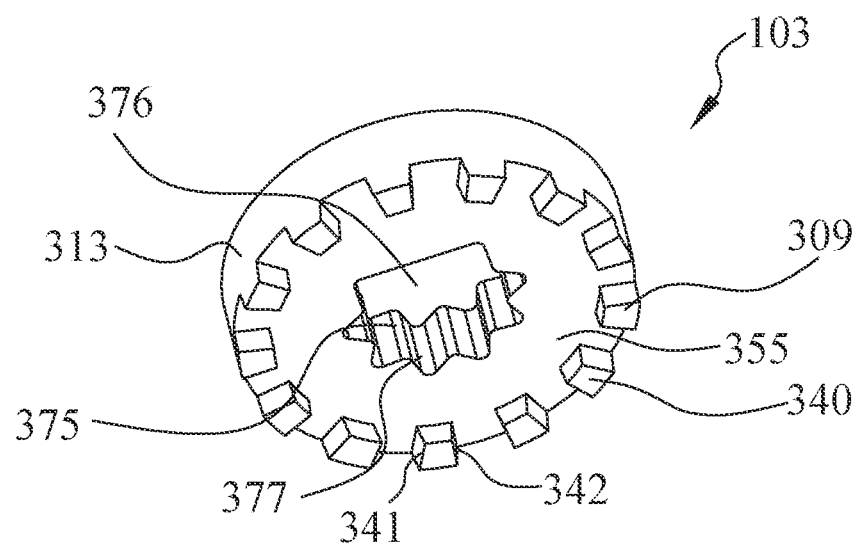
FIG. 3A is a perspective view of an engagement element in FIG. 1C.
Figure 3B:
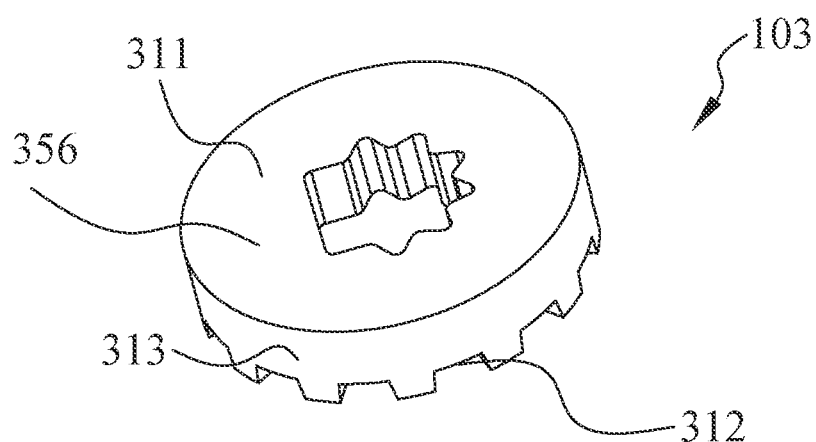
FIG. 3B is a perspective view of the engagement element in FIG. 3A from another perspective.

FIG. 3A is a perspective view of the engagement element in FIG. 1C, and FIG. 3B is a perspective view of the engagement element in FIG. 3A from another perspective. As shown in FIGS. 3A and 3B, the engagement element 103 is substantially cylindrical and has a side portion 313 extending in the circumferential direction. In an axial direction of the engagement element 103, the engagement element 103 has a first end 311 and a second end 312. The first end 311 is arranged facing the bottom 231 of the mounting cavity 205, and the second end 312 is arranged facing the second rotating component 105. An end surface 356 of the first end 311 is substantially flat.

A plurality of protrusions 309 are provided on the second end 312, and the plurality of protrusions 309 are evenly arranged in the circumferential direction to form a first engagement portion 340. Each protrusion 309 has a pair of engagement surfaces 341 and 342, and the engagement surfaces 341 and 342 obliquely extend toward each other from an end surface 355 of the second end 312 in a direction away from the end surface 355 of the second end 312, such that the engagement surfaces 341 and 342 are bevels inclined toward each other. The engagement surfaces 341 and 342 are engagable with corresponding parts of the second rotating component 105. The plurality of protrusions 309 are arranged close to an outer side edge of the end surface 355 of the second end 312, and an outer edge of each protrusion 309 is flush with the side portion 313 of the engagement element 103.

A matching portion 376 is provided in the middle of the engagement element 103, and the matching portion 376 is a through hole 375 that extends in the axial direction and through the first end 311 and the second end 312. The matching portion 376 is provided with a plurality of recesses 377 extending in the radial direction, such that the matching portion 376 is non-circular. The matching portion 376 matches with the positioning portion 266 of the first rotating component 101 in shape, such that the positioning portion 266 can enter into the matching portion 376 in a specific direction. The matching portion 376 matches with the positioning portion 266 such that the engagement element 103 is movable relative to the first rotating component 101 in the axial direction, but is not rotatable relative to the first rotating component 101.

Figure 4A:
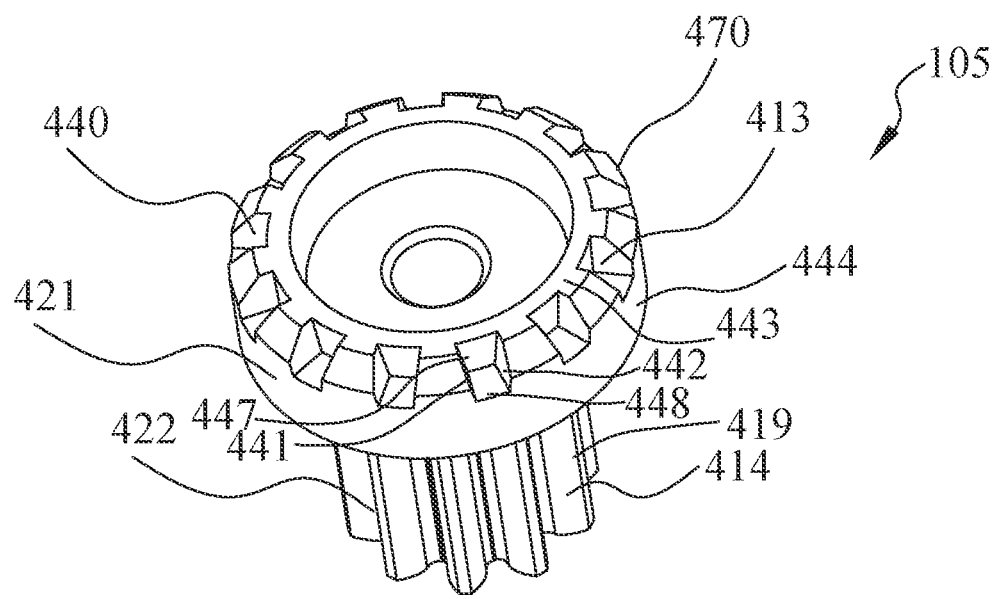
FIG. 4A is a perspective view of a second rotating component in FIG. 1C.
Figure 4B:
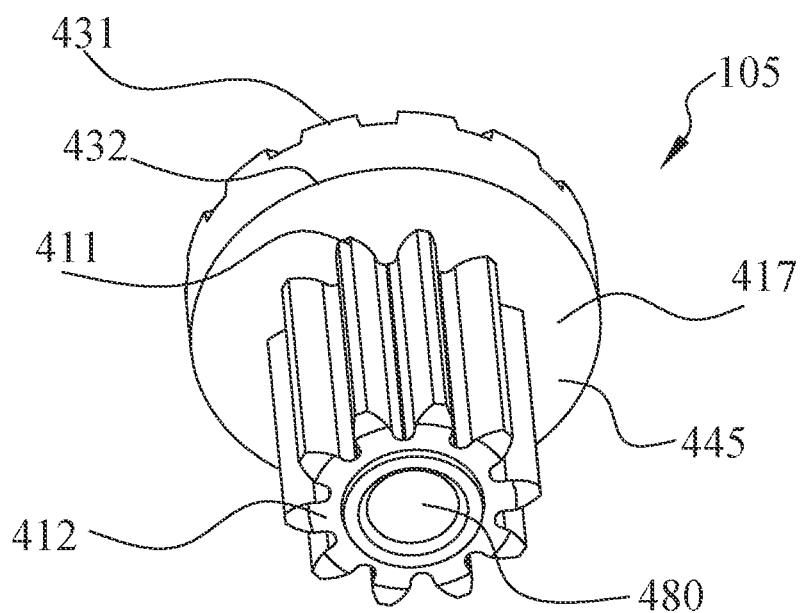
FIG. 4B is a perspective view of the second rotating component in FIG. 4A from another perspective.

FIG. 4A is a perspective view of the second rotating component in FIG. 1C, and FIG. 4B is a perspective view of the second rotating component in FIG. 4A from another perspective. As shown in FIGS. 4A and 4B, the second rotating component 105 is a gear and extends in the axial direction. In the axial direction, the second rotating component 105 comprises a first segment 421 and a second segment 422. The first segment 421 has a front end 431 and a rear end 432, the front end 431 is arranged facing the engagement element 103, and the rear end 432 is connected to the second segment 422. A diameter of the first segment 421 is greater than a diameter of the second segment 422, such that a step surface 417 is formed at a connection between the first segment 421 and the second segment 422. The step surface 417 is formed by an end surface 445 of the rear end 432 of the first segment 421. The step surface 417 can engage with the fixing device 108.

In a direction from the rear end 432 to the front end 431 of the first segment 421, an outer diameter of the front end 431 of the first segment 421 gradually decreases, thereby forming inclined bevels 470. A plurality of recesses 413 is provided in the front end 431 of the first segment 421, and the plurality of recesses 413 are evenly arranged in the circumferential direction to form a second engagement portion 440. Each recess 413 is recessed inwardly from an end surface 443 of the front end 431 and from a side surface 444 in the circumferential direction. Each recess 413 has a bottom surface 448, a side surface 447, a first matching surface 441 and a second matching surface 442. The bottom surface 448 extends in the radial direction, and the side surface 447 extends in the axial direction. A pair of matching surfaces, namely, the first matching surface 441 and the second matching surface 442 that are disposed opposite each other are connected to the bottom surface 448 and the side surfaces 447, and extend from the bottom surface 448 away from each other. The first matching surface 441 and the second matching surface 442 of each recess 413 obliquely extend away from each other in a direction from the rear end 432 to the front end 431. The inclination directions of the first matching surface 441 and the second matching surface 442 of each recess 413 match the inclination directions of the engagement surfaces 341 and 342 of the protrusion 309, that is to say, the recess 413 of the second rotating component 105 matches the protrusion 309 of the engagement element 103 in shape.

A first axial end 411 of the second segment 422 is connected to the first segment 421. The second segment 422 forms a transmission portion 414 of the second rotating component 105. A second set of teeth 419 is provided on an outer side of the transmission portion 414 in the circumferential direction, and each tooth of the second set of teeth 419 extends in the axial direction. A plurality of teeth of the second set of teeth 419 are evenly arranged in the circumferential direction. The second set of teeth 419 is capable of meshing with an external gear to transmit power.

The second rotating component 105 is provided with a channel 480 that extends in the axial direction and through the first segment 421 and the second segment 422, and the channel 480 is used for mounting the shaft 109.

Figure 5:
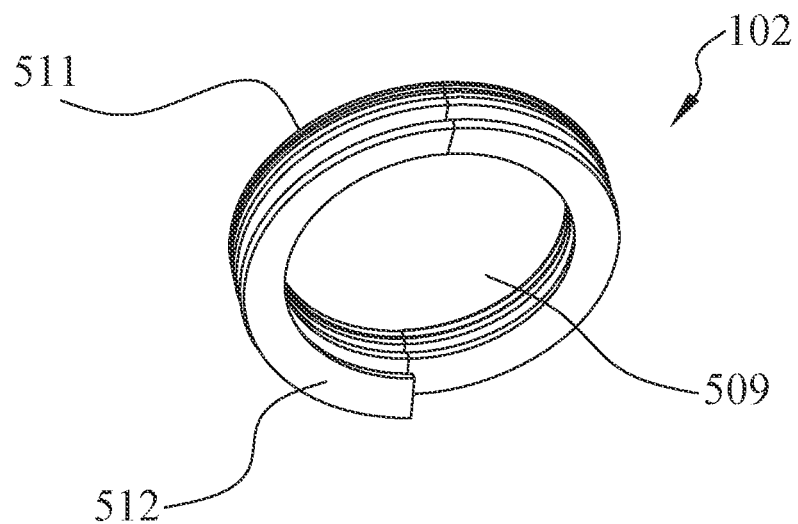
FIG. 5 is a perspective view of an elastic device in FIG. 1C.

FIG. 5 is a perspective view of the elastic device in FIG. 1C. The elastic device 102 is a spring. The elastic device 102 fits with the mounting cavity 205 in size. The elastic device 102 is provided with a hole 509 and can be sleeved on the positioning portion 266 of the first rotating component 101. The first end 511 of the elastic device 102 can abut against the bottom 231 of the mounting cavity 205 of the first rotating component 101, and the second end 512 can abut against the end surface 356 of the first end 311 of the engagement element 103. The elastic device 102 is compressible and releasable such that a distance between the first rotating component 101 and the engagement element 103 is changed in the axial direction.

Figure 6:
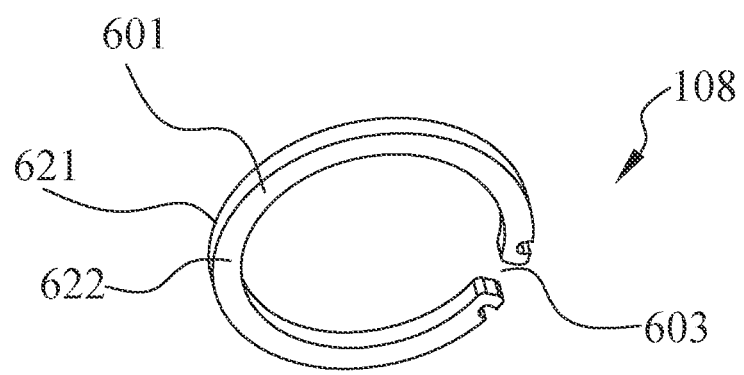
FIG. 6 is a perspective view of a fixing device in FIG. 1C.

FIG. 6 is a perspective view of the fixing device in FIG. 1C. As shown in FIG. 6, the fixing device 108 is an annular snap ring 601. The snap ring 601 has an opening 603, and the opening 603 allows the snap ring 601 to be compressible so as to reduce an outer diameter thereof. The snap ring 601 is made of a metallic material such that the snap ring 601 has certain elasticity and strength. The snap ring 601 is in the shape of a flat sheet and has a certain width in the radial direction, such that the snap ring 601 has a first surface 621 and a second surface 622.

Figure 7:
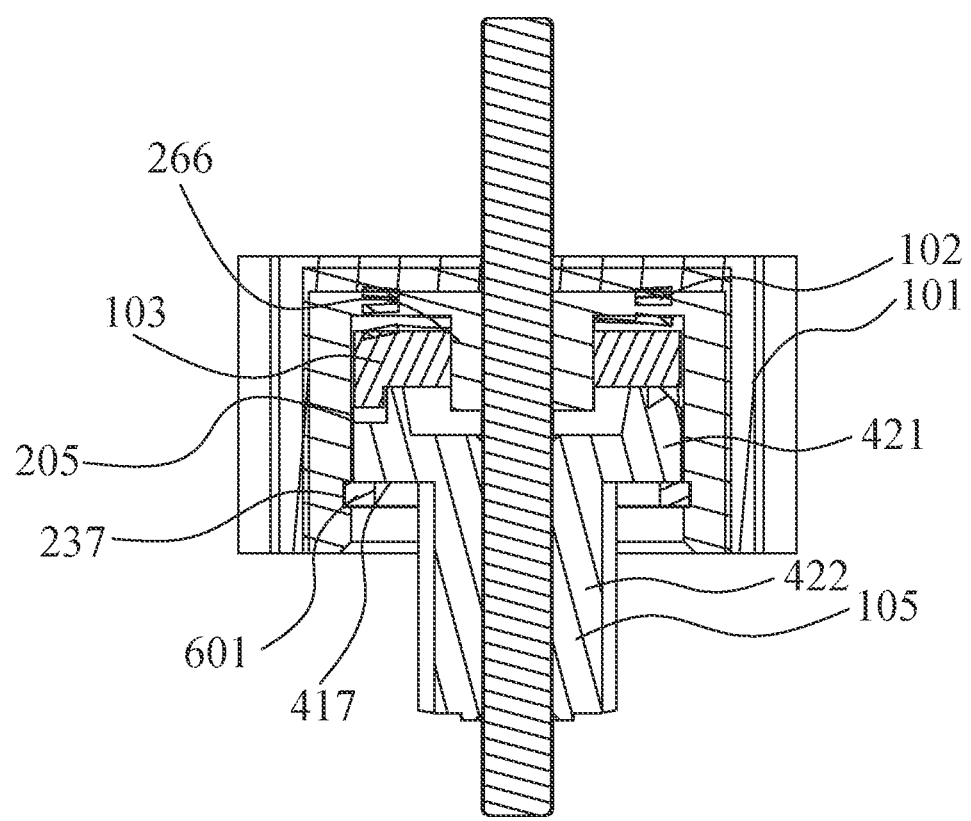
FIG. 7 is an axial cross-sectional view of the clutch in FIG. 1A.

FIG. 7 is an axial cross-sectional view of the clutch in FIG. 1A. As shown in FIG. 7, the elastic device 102, the engagement element 103 and the second rotating component 105 are sequentially mounted in the mounting cavity 205 of the first rotating component 101. The snap ring 601 fixes the second rotating component 105 in the axial direction to prevent the elastic device 102, the engagement element 103 and the second rotating component 105 from falling off from the mounting cavity 205. The shaft 109 passes through the elastic device 102, the engagement element 103, the second rotating component 105 and the first rotating component 101, such that the first rotating component 101 and the second rotating component 105 are rotatable about the shaft 109.

The elastic device 102 and the engagement element 103 are both sleeved on the positioning portion 266 of the first rotating component 101. The positioning portion 266 matches with the matching portion 376 of the engagement element 103 in shape, such that the engagement element 103 is not rotatable relative to the first rotating component 101. The matching portion 376 is slidable relative to the positioning portion 266, such that the engagement element 103 is movable relative to the first rotating component 101 in the axial direction. The elastic device 102 is disposed between the bottom 231 of the mounting cavity 205 and the engagement element 103. The elastic device 102 is in a compressed state so as to exert an elastic force to the engagement element 103 toward the second rotating component 105. The elastic device 102 and the engagement element 103 jointly form the clutch mechanism 160, and the engagement element 103 is engagable with or disengagable from the second rotating component 105.

The second rotating component 105 is disposed on a side of the engagement element 103 away from the elastic device 102. The first segment 421 of the second rotating component 105 is located in the mounting cavity 205. The second segment 422 of the second rotating component 105 extends out of the mounting cavity 205. The second set of teeth 419 of the second segment 422 is capable of meshing with the external gear.

The snap ring 601 is mounted in the groove 237 of the mounting cavity 205. When the snap ring 601 is in a free/rest state, the outer diameter of the snap ring 601 is greater than the diameter of an inner wall of the mounting cavity 205. During mounting of the snap ring 601, the snap ring 601 is first compressed to deform, such that an outer diameter thereof decreases, enabling the snap ring 601 to enter into the mounting cavity 205; the snap ring 601 is then pushed into the groove 237, and the snap ring 601 restores its shape in the groove 237, such that the snap ring 601 is located in the groove 237 and it is difficult for the snap ring 601 to fall out of the groove 237. The width of the snap ring 601 in the radial direction is greater than a depth of the groove 237, and a thickness of the snap ring 601 is approximately equal to or slightly less than a separation distance between the pair of side walls 278 and 279 of the groove 237. When the snap ring 601 is mounted in the groove 237 in place, an outer side of the snap ring 601 is located in the groove 237, and an inner side thereof protrudes from the side wall of the mounting cavity 205 and abuts against the step surface 417 of the second rotating component 105, so as to prevent the second rotating component 105 from leaving the mounting cavity 205. That is to say, an inner side of the first surface 621 of the snap ring 601 is in contact with the step surface 417 of the second rotating component 105, and an outer side of the second surface 622 of the snap ring 601 is in contact with the side wall 278 of the groove 237. The snap ring 601 and the groove 237 are both made of a metallic material and thus are less prone to wear, so that it is difficult for the snap ring 601 to fall out of the groove 237.

The elastic device 102 provides a pushing force to the second rotating component 105 by means of the engagement element 103, so as to keep the second rotating component 105 in a position where the second rotating component 105 is in contact with the snap ring 601. The second rotating component 105 is rotatable about the shaft 109, but is not movable in the axial direction relative to the first rotating component 101.

In an embodiment of the present disclosure, the second rotating component 105 is connected to an external load, and the first rotating component 101 is connected to a power device. When the external load is in a normal range, the second rotating component 105 is engaged with the engagement element 103, and the first rotating component 101 can transmit power to the second rotating component 105. When the external load is too large and exceeds the normal range, a friction force between the first engagement portion 340 of the engagement element 103 and the second engagement portion 440 of the second rotating component 105 is not enough to drive the second rotating component 105 to rotate, and an acting force between the engagement element 103 and the second rotating component 105 can overcome the elastic force of the elastic device 102, allowing the engagement element 103 to move toward the bottom 231 of the mounting cavity 205. In this case, the first engagement portion 340 is disengaged from the second engagement portion 440, and no power is transmitted between the second rotating component 105 and the first rotating component 101. The clutch of the present disclosure is applied for overload protection of an actuator of a small charging door of a vehicle.

Figure 8:
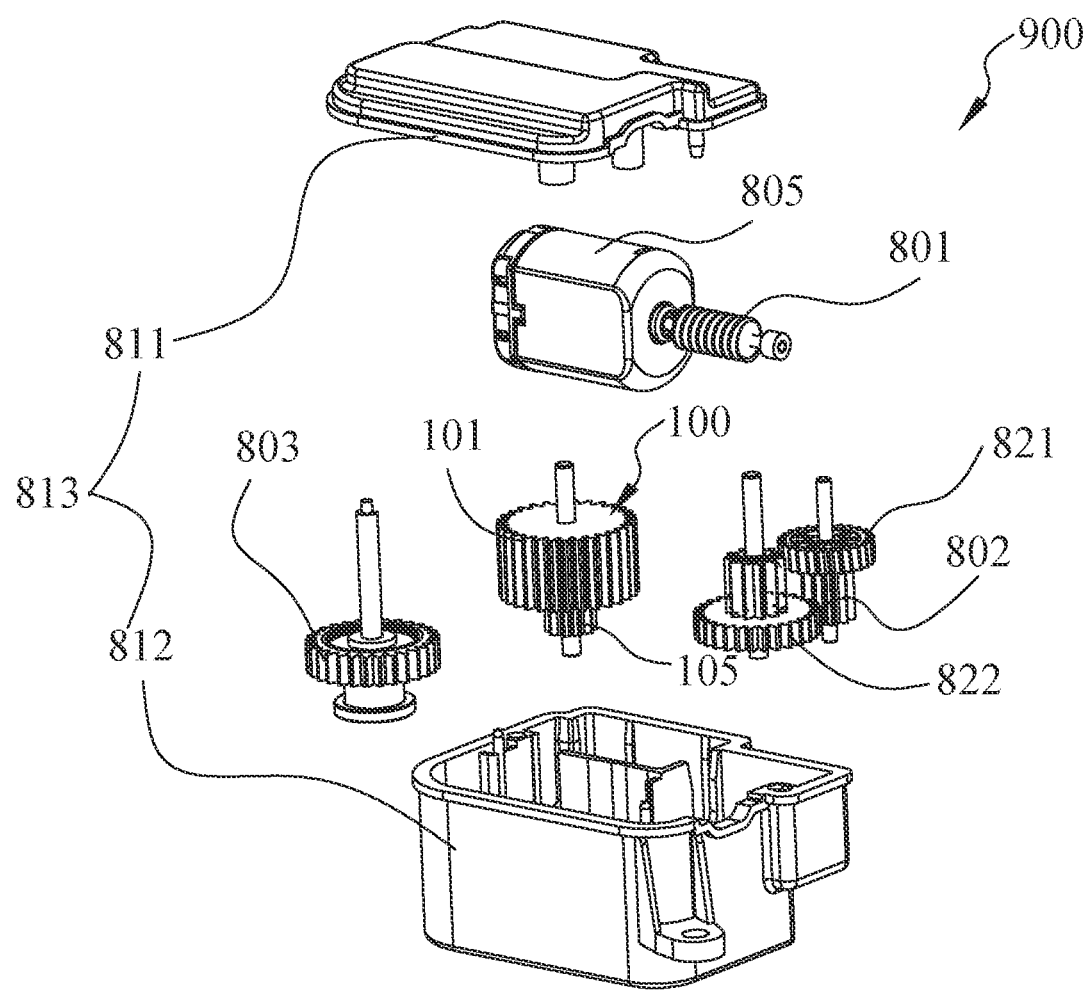
FIG. 8 is an exploded view of an actuator according to a first embodiment of the present disclosure.
Figure 9:
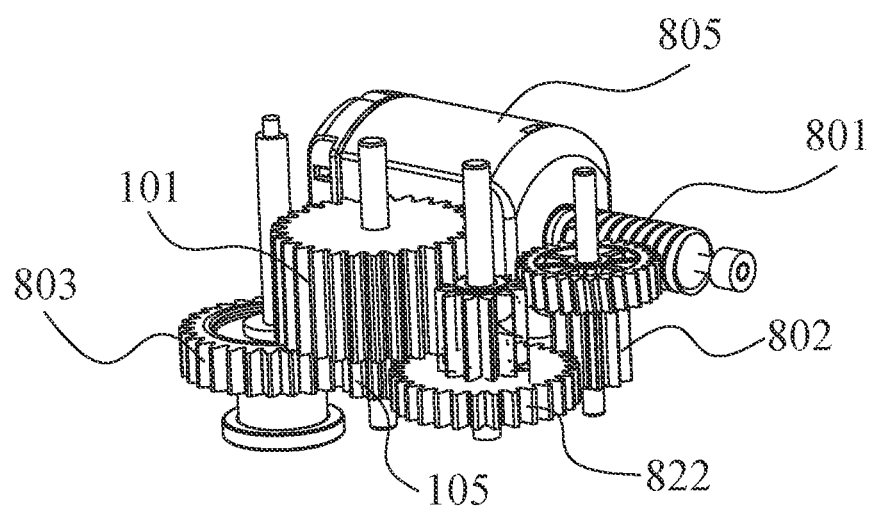
FIG. 9 is a perspective view of the actuator in FIG. 8, with a housing removed.

FIG. 8 is an exploded view of an actuator according to a first embodiment of the present disclosure, and FIG. 9 is a perspective view of the actuator in FIG. 8, with a housing removed.

As shown in FIGS. 8 and 9, the actuator 900 comprises the housing 813, an electric motor 805, an input gear assembly 802, an output gear 803, and a clutch 100. The housing 813 comprises a body 812 and an upper cover 811. The input gear assembly 802, the output gear 803, and the clutch 100 are located in the body 812, and the upper cover 811 encloses an opening of an upper portion of the body 812. The electric motor 805 has a worm 801, and the worm 801 is drivable to rotate. The input gear assembly 802 comprises a first gear 821 and a second gear 822, the first gear 821 meshes with the worm 801, and the second gear 822 meshes with the first gear 821 and the first rotating component 101 of the clutch 100. The output gear 803 meshes with the second rotating component 105 and is connected to the external load. When the worm 801 rotates, the power is transmitted to the external load by means of the input gear assembly 802, the clutch 100 and the output gear 803 in sequence. When the external load exceeds a predetermined range such that the output gear 803 is subjected to an external overload force, the first rotating component 101 of the clutch 100 is disengaged from the second rotating component 105 thereof, and the power of the electric motor 805 cannot be transmitted to the external load.

In this embodiment, the first set of teeth 236 of the first rotating component 101 extends from the first axial end 211 to the second axial end 212, that is to say, the first set of teeth 236 is arranged across the first rotating component 101 in the axial direction. The second gear 822 of the input gear assembly 802 is capable of meshing with any position of the first rotating component 101 in the axial direction, so that the position arrangement of the second gear 822 is more flexible. In an embodiment of the present disclosure, a meshing position of the second gear 822 and the first rotating component 101 is close to an end of the first rotating component 101 facing the second rotating component 105, such that the input gear assembly 802 and the clutch 100 are compactly positioned. In another embodiment of the present disclosure, a meshing position of the second gear 822 and the first rotating component 101 is close to an end of the first rotating component 101 away from the second rotating component 105, or is located in the middle of the first rotating component 101.

In the clutch of the present disclosure, the first rotating component 101 is a gear and is provided with the mounting cavity 205. The mounting cavity 205 can accommodate the clutch mechanism 160 and at least a portion of the second rotating component 105. In the present disclosure, the clutch mechanism 160 and the second rotating component 105 are axially fixed by means of the mounting cavity 205 and the fixing device 108. In the present disclosure, the clutch mechanism 160 and the second rotating component 105 are axially fixed in a simple and reliable manner, with requiring easy mounting process and being less prone to damage.

Figure 10:
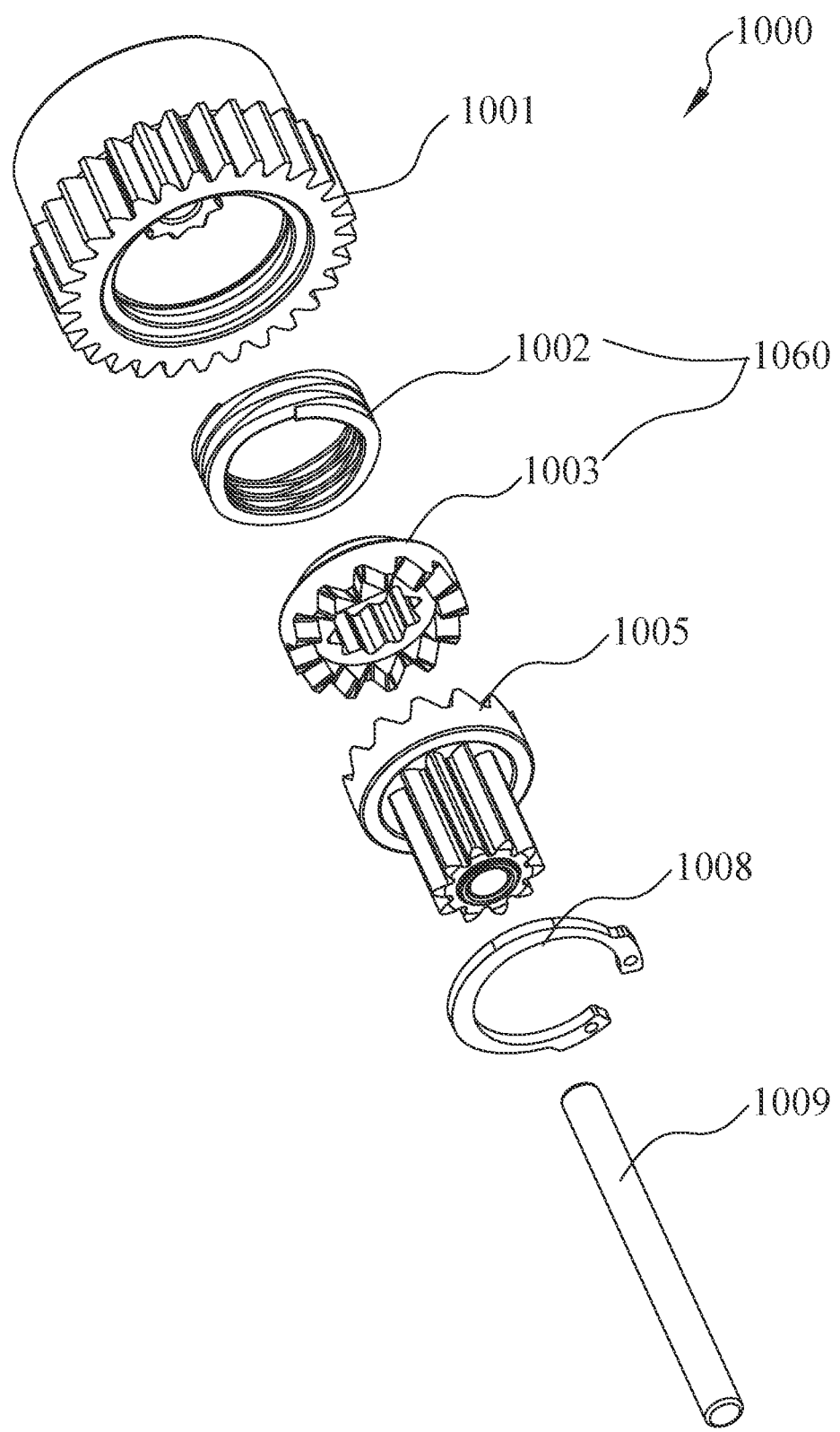
FIG. 10 is an exploded view of a clutch according to a second embodiment of the present disclosure.

FIG. 10 is an exploded view of a clutch according to a second embodiment of the present disclosure. Similar to the clutch shown in FIG. 1A, the clutch 1000 comprises a first rotating component 1001, a clutch mechanism 1060, a second rotating component 1005, a fixing device 1008 and a shaft 1009. The shaft 1009 passes through the first rotating component 1001, the clutch mechanism 1060, and the second rotating component 1005. The fixing device 108 axially fixes the first rotating component 1001, the clutch mechanism 1060, and the second rotating component 1005. The first rotating component 1001, the clutch mechanism 1060 and the second rotating component 1005 are rotatable about the shaft 1009, but are not movable radially relative to the shaft 1009. One of the first rotating component 1001 and the second rotating component 1005 is a driving component that is connected to a power input end; and the other thereof is a transmission component that is connected to a power output end. The clutch mechanism 1060 is disposed between the first rotating component 1001 and the second rotating component 1005. The clutch mechanism 1060 comprises an elastic device 1002 and an engagement element 1003. The engagement element 1003 is connected to the first rotating component 1001 and is movable in an axial direction of the first rotating component 1001. The engagement element 1003 is engagable with or disengagable from the second rotating component 1005 so as to enable or disenable the power transmission between the first rotating component 1001 and the second rotating component 1005.

In the clutch 100 shown in FIG. 10, the first rotating component 1001, the elastic device 1002, the fixing device 1008 and the shaft 1009 of the clutch 1000 are respectively structurally the same as the first rotating component 101, the elastic device 102, the fixing device 108 and the shaft 109 in the first embodiment shown in FIG. 1A. The engagement element 1003 and the second rotating component 1005 of the clutch 1000 are respectively structurally different from the engagement element 103 and the second rotating component 105 in the first embodiment shown in FIG. 1A.

Figure 11A:
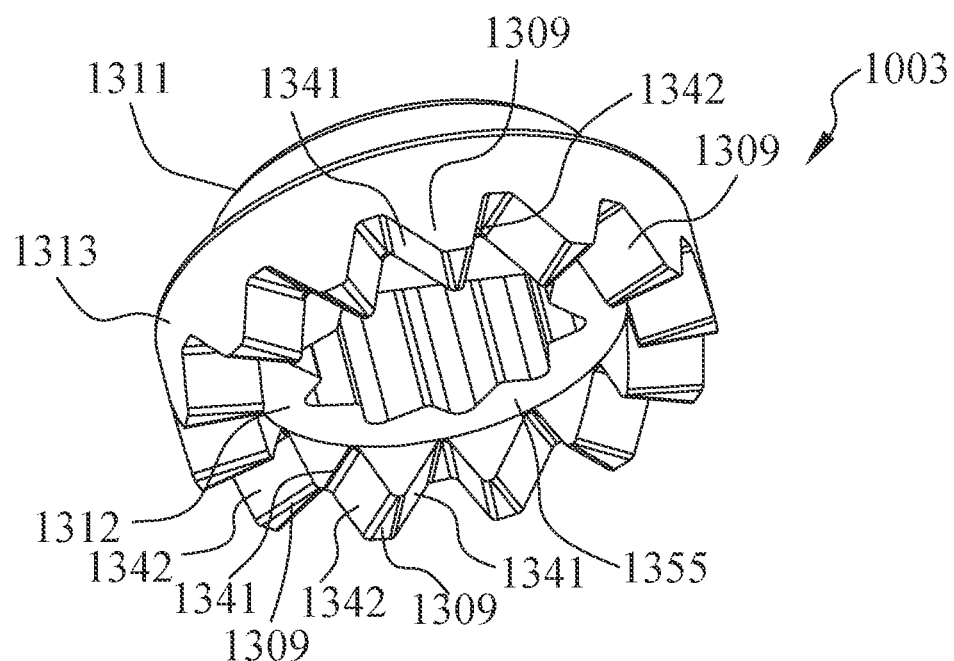
FIG. 11A is a perspective view of an engagement element of the clutch in FIG. 10.
Figure 11B:
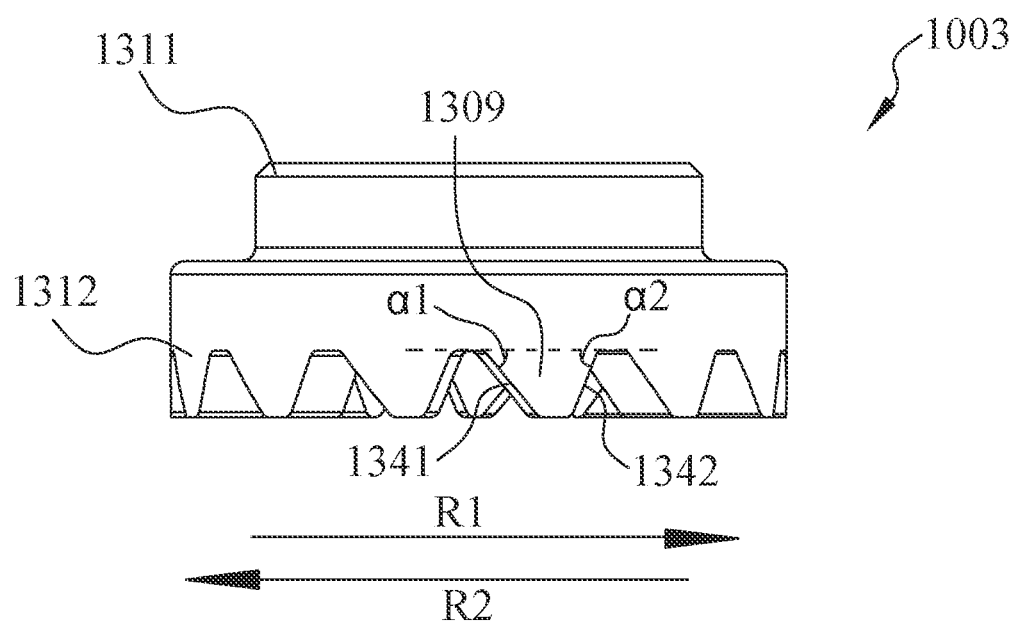
FIG. 11B is a side view of the engagement element of FIG. 11A.

FIG. 11A is a perspective view of the engagement element of the clutch in FIG. 10, and FIG. 11B is a side view of the engagement element in FIG. 11A. As shown in FIGS. 11A and 11B, similar to the engagement element 103 of the clutch 100 in the first embodiment shown in FIG. 3A, the engagement element 1003 is substantially cylindrical and has a side portion 1313 extending in a circumferential direction. In an axial direction of the engagement element 1003, the engagement element 1003 has a first end 1311 and a second end 1312. The first end 1311 is arranged facing the first rotating component 1001, and the second end 1312 is arranged facing the second rotating component 1005.

A plurality of protrusions 1309 are provided on the second end 1312, and the plurality of protrusions 1309 are evenly arranged in the circumferential direction. The plurality of protrusions 1309 are different from the plurality of protrusions 309 of the engagement element 103 in FIG. 3A in shape. Each protrusion 1309 has a first engagement surface 1341 and a second engagement surface 1342, and the first engagement surface 1341 and the second engagement surface 1342 obliquely extend toward each other from an end surface 1355 of the second end 1312 in a direction away from the end surface 1355 of the second end 1312, such that the first engagement surface 1341 and the second engagement surface 1342 are bevels inclined toward each other. The end surface 1355 of the second end 1312 extends in a radial direction of the clutch 1000. There is a first included angle $\alpha 1$ between the first engagement surface 1341 and an extension direction of the end surface 1355 of the second end 1312, there is a second included angle $\alpha 2$ between the second engagement surface 1342 and the extension direction of the end surface 1355 of the second end 1312, and the first included angle $\alpha 1$ is less than the second included angle $\alpha 2$. That is to say, the first engagement surface 1341 and the second engagement surface 1342 have different inclination angles relative to the plane in the radial direction of the clutch 1000.

The plurality of protrusions 1309 each has the same shape. The engagement element 1003 is rotatable in a first direction R1 or a second direction R2. In the first direction R1 or the second direction R2, the first engagement surface 1341 of each protrusion 1309 is located on the same side of each protrusion 1309. That is to say, in the first direction R1 or the second direction R2, the first engagement surface 1341 of each protrusion 1309 is located upstream or downstream of the second engagement surface 1342 in the rotation direction. In an embodiment of the present disclosure, in the first direction R1, the first engagement surface 1341 of each protrusion 1309 is located upstream of the second engagement surface 1342, and in the second direction R2, the first engagement surface 1341 of each protrusion 1309 is located downstream of the second engagement surface 1342.

The first engagement surface 1341 and the second engagement surface 1342 are engagable with corresponding parts of the second rotating component 1005. The angles of the first engagement surface 1341 and the second engagement surface 1342 are set such that a holding force of the clutch 1000 during rotation in the first direction R1 is different from a holding force during rotation in the second direction R2.

Figure 12A:
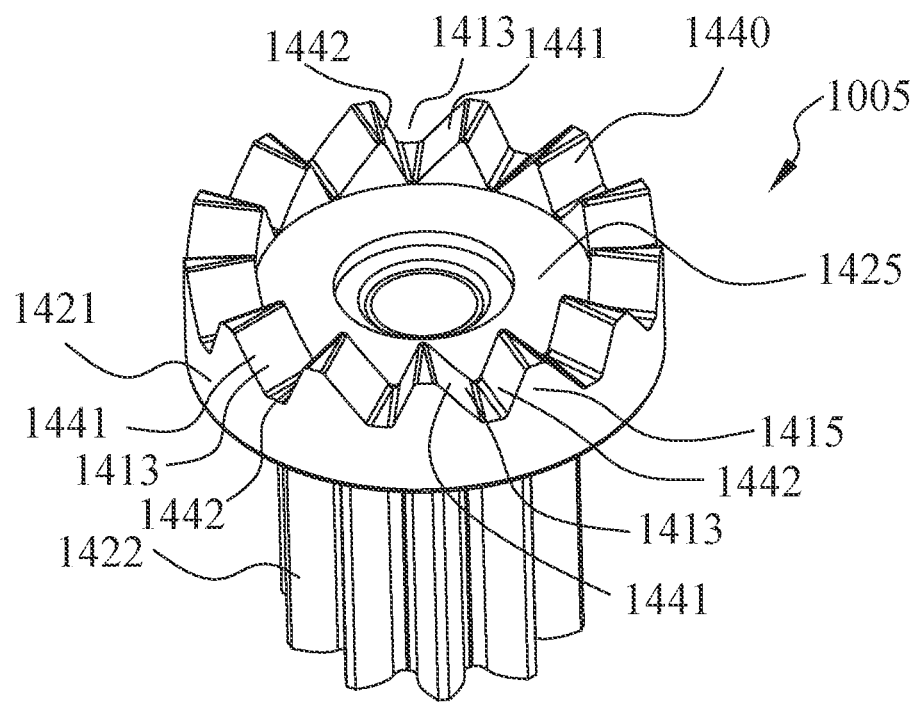
FIG. 12A is a perspective view of a second rotating component of the clutch in FIG. 10.
Figure 12B:
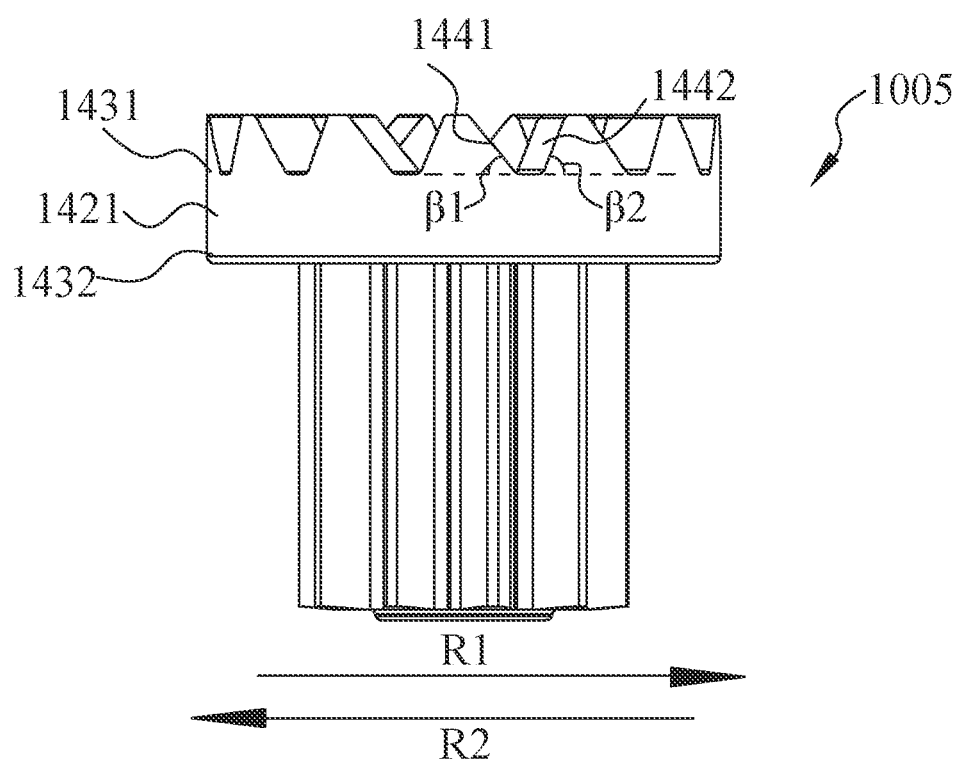
FIG. 12B is a side view of the second rotating component in FIG. 12A.

FIG. 12A is a perspective view of the second rotating component of the clutch in FIG. 10, and FIG. 12B is a side view of the second rotating component in FIG. 12A.

The second rotating component shown in FIG. 12A is similar to the second rotating component shown in FIG. 4A. As shown in FIGS. 12A and 12B, the second rotating component 1005 is a gear and extends in the axial direction. In the axial direction, the second rotating component 1005 comprises a first segment 1421 and a second segment 1422. The first segment 1421 has a front end 1431 and a rear end 1432, the front end 1431 is arranged facing the engagement element 1003, and the rear end 1432 is connected to the second segment 1422. A diameter of the first segment 1421 is greater than a diameter of the second segment 1422. The difference from the second rotating component 105 shown in FIG. 4A lies in that recesses of the second rotating component 1005 are different from those of the second rotating component 105 in shape.

A plurality of protrusions 1415 are provided on the front end 1431 of the first segment 1421, the plurality of protrusions 1415 extend in the axial direction from an end surface 1425 of the front end 1431, recesses 1413 are formed between adjacent protrusions 1415, and a plurality of recesses 1413 are evenly arranged in the circumferential direction to form a second engagement portion 1440. Each recess 1413 has a first matching surface 1441 and a second matching surface 1442. The first matching surface 1441 and the second matching surface 1442 of each recess 1413 obliquely extend away from each other in a direction from the rear end 1432 to the front end 1431, such that the first matching surface 1441 and the second matching surface 1442 are bevels inclined away from each other. The end surface 1425 of the front end 1431 extends in the radial direction of the clutch 1000. There is a first included angle $\beta 1$ between the first matching surface 1441 and an extension direction of the end surface 1425 of the front end 1431, there is a second included angle $\beta 2$ between the second matching surface 1442 and the extension direction of the end surface 1425 of the front end 1431, and the first included angle $\beta 1$ is less than the second included angle $\beta 2$. That is to say, the first matching surface 1441 and the second matching surface 1442 have different inclination angles relative to the radial direction of the clutch 1000. Each of the plurality of recesses 1413 has the same shape. In the circumferential direction, that is, in the first direction R1 or the second direction R2, the first matching surface 1441 of each recess 1413 is located on the same side of each recess 1413.

The inclination directions of the first matching surface 1441 and the second matching surface 1442 of the recess 1413 match the inclination directions of the first engagement surface 1341 and the second engagement surface 1342 of the protrusion 1309, that is to say, the recess 1413 of the second rotating component 1005 matches the protrusion 1309 of the engagement element 1003 in shape. That is to say, the first included angle $\beta 1$ is approximately equal to the first included angle $\alpha 1$, and the second included angle $\beta 2$ is approximately equal to the second included angle $\alpha 2$.

In the embodiment shown in FIG. 10, since the first engagement surface 1341 and the second engagement surface 1342 of each protrusion 1309 have different inclination angles, and the first matching surface 1441 and the second matching surface 1442 of each recess 1413 have different inclination angles, the clutch 1000 has different holding forces in the first direction R1 and the second direction R2. That is to say, external forces required for switching the clutch 1000 from an engaged state to a disengaged state are different in the first direction R1 and in the second direction R2. In the embodiment shown in FIGS. 11A and 12A, since the first included angle $\alpha 1$ is less than the second included angle $\alpha 2$, the holding force of the clutch 1000 in the first direction R1 is greater than the holding force in the second direction R2. That is to say, it is easier to disengage during the rotation of the clutch 1000 in the second direction R2. The clutch 1000 in this embodiment is suitable for application scenarios where different holding forces are required in different rotation directions.

Although the present disclosure is described in conjunction with the examples of embodiments outlined above, various alternatives, modifications, variations, improvements, and/or substantial equivalents that are known or current or to be anticipated before long may be obvious to those of at least ordinary skill in the art. Furthermore, the technical effects and/or technical problems described in this description are exemplary rather than limiting. The disclosure in this description may be used to solve other technical problems and may have other technical effects. Accordingly, the examples of the embodiments of the present disclosure as set forth above are intended to be illustrative rather than limiting. Various changes may be made without departing from the spirit or scope of the present disclosure. Therefore, the present disclosure is intended to embrace all known or earlier disclosed alternatives, modifications, variations, improvements, and/or substantial equivalents.

What is claimed is:

1. A clutch, comprising:
a first rotating component, the first rotating component being provided with a mounting cavity;
a clutch mechanism, the clutch mechanism being mounted in the mounting cavity; and
a second rotating component;
wherein the first rotating component, the clutch mechanism, and the second rotating component are configured such that the first rotating component is engagable with or disengagable from the second rotating component by means of the clutch mechanism, and
wherein at least a portion of the second rotating component is mounted in the mounting cavity;
a shaft, wherein the shaft passes through the first rotating component, the clutch mechanism, and the second rotating component; and
a fixing device cooperating with the mounting cavity so as to provide axial fixation of the second rotating component in the mounting cavity.

2. The clutch according to claim 1, wherein
the mounting cavity configured to receive at least a portion of the second rotating component to provide axial fixation of the second rotating component.

3. The clutch according to claim 1, wherein
the first rotating component is a first gear, a first set of teeth is provided on an outer side of the first gear, and at least a portion of the first set of teeth is aligned with the mounting cavity; and
the second rotating component is a second gear, the second gear comprises a transmission portion, and a second set of teeth is provided on an outer side of the transmission portion.

4. The clutch according to claim 3, wherein
the first rotating component has a first axial end and a second axial end, and the first set of teeth extends from the first axial end to the second axial end.

5. The clutch according to claim 1, wherein
the clutch mechanism comprises an elastic device and an engagement element, the mounting cavity has a bottom, and the elastic device is disposed between the bottom and the engagement element.

6. The clutch according to claim 5, wherein
the elastic device is a spring, a plurality of protrusions are provided at one end of the engagement element, and a plurality of recesses are provided at one end of the second rotating component, and the plurality of protrusions are capable of matching with the plurality of recesses, such that the clutch mechanism is engaged with or disengaged from the second rotating component.

7. The clutch according to claim 6, wherein
the plurality of protrusions are arranged in a circumferential direction, each of the plurality of protrusions has a first engagement surface and a second engagement surface that are disposed opposite each other, the first engagement surface of each protrusion is located on the same side of each protrusion in the circumferential direction, and an inclination angle of the first engagement surface relative to a radial direction of the clutch is less than an inclination angle of the second engagement surface relative to a plane in the radial direction of the clutch; and
the plurality of recesses are arranged in the circumferential direction, each of the plurality of recesses has a first matching surface and a second matching surface that are disposed opposite each other, the first matching surface is capable of matching with the first engagement surface and the second matching surface is capable of matching with the second engagement surface, the first matching surface of each recess is located on the same side of each recess in the circumferential direction, and an inclination angle of the first matching surface relative to the radial direction of the clutch is less than an inclination angle of the second matching surface relative to the plane in the radial direction of the clutch.

8. The clutch according to claim 1, wherein
the first rotating component is a driving component, and the second rotating component is a transmission component.

9. The clutch according to claim 1, wherein
the first rotating component is a transmission component, and the second rotating component is a driving component.

10. The clutch according to claim 1, wherein
wherein the first rotating component the clutch mechanism and the second rotating component are rotatable about the shaft, and the shaft is capable of limiting radial movements of the first rotating component, the clutch mechanism and the second rotating component.

11. The clutch according to claim 1, wherein
the clutch is used for overload protection of a vehicle.

12. An actuator, comprising:
a clutch according to claim 1;
a worm, the worm being drivable to rotate;
an input gear assembly, the input gear assembly being capable of meshing with each of the first rotating component and the worm, such that the worm is capable of driving the first rotating component to rotate by means of the input gear assembly; and
an output gear, the output gear being capable of meshing with the second rotating component.

13. The actuator according to claim 12, wherein
a meshing position of the input gear assembly and the first rotating component is at or adjacent an end of the first rotating component facing the second rotating component.

14. The actuator according to claim 12, wherein
when the output gear is subjected to an external overload force, the second rotating component is disengagable from the first rotating component.

15. A clutch comprising:
a first rotating component comprising a mounting cavity having a groove;
a clutch mechanism mounted in the mounting cavity;
a second rotating component comprising a step surface;

wherein the first rotating component, the clutch mechanism, and the second rotating component are configured such that the first rotating component is engagable with or disengagable from the second rotating component via the clutch mechanism, and wherein at least a portion of the second rotating component is mounted in the mounting cavity; and a snap ring, wherein the snap ring is configured to cooperate with the groove and the step surface to provide axial fixation of the second rotating component in the mounting cavity.

16. The clutch according to claim 15, wherein the groove is an annular groove extending in a circumferential direction, and the snap ring has an opening.

17. The clutch according to claim 15, wherein the first rotating component comprises a bushing and a toothed portion, the groove is provided in the bushing, and the bushing is integrally formed with the toothed portion.

18. The clutch according to claim 17, wherein each of the snap ring and the bushing is made of a metallic material.

19. A clutch comprising:

a first rotating component comprising a mounting cavity and a positioning portion;

a clutch mechanism mounted in the mounting cavity, the clutch mechanism comprising an elastic device and an engagement element, wherein the engagement element comprises a matching portion, and the positioning portion is configured to match with the matching portion to limit a rotation of the engagement element relative to the first rotating component; and a second rotating component;

wherein the first rotating component, the clutch mechanism, and the second rotating component are configured such that the first rotating component is engagable with or disengagable from the second rotating component via the clutch mechanism, and wherein at least a portion of the second rotating component is mounted in the mounting cavity.

* * * * *